United States Patent
Yageta et al.

(10) Patent No.: US 6,902,844 B2
(45) Date of Patent: Jun. 7, 2005

(54) FILM-SEALED NON-AQUEOUS ELECTROLYTE BATTERY WITH IMPROVED SURFACE-TREATED LEAD TERMINAL

(75) Inventors: Hiroshi Yageta, Tokyo (JP); Hidemasa Kawai, Tokyo (JP); Masato Shirakata, Tokyo (JP); Tetsuya Takashima, Tochigi (JP); Ikuo Kojima, Tochigi (JP); Norihide Ohyama, Tochigi (JP); Hiroyuki Iizuka, Tokyo (JP)

(73) Assignees: NEC Corporation (JP); NEC Tokin Corporation (JP); Nihon Parkerizing Co., Ltd. (JP)

( * ) Notice: Subject to any disclaimer, the term of this patent is extended or adjusted under 35 U.S.C. 154(b) by 482 days.

(21) Appl. No.: 10/061,975

(22) Filed: Jan. 31, 2002

(65) Prior Publication Data

US 2002/0146621 A1 Oct. 10, 2002

(30) Foreign Application Priority Data

Feb. 5, 2001 (JP) ........................................ 2001-028146

(51) Int. Cl.⁷ ............................. H01M 2/02; H01M 2/08
(52) U.S. Cl. ...................... 429/185; 429/65; 429/162; 429/176; 429/178; 429/181; 429/184
(58) Field of Search .................... 429/65, 162, 176, 429/178, 181, 184, 185

(56) References Cited

U.S. PATENT DOCUMENTS

| | | | |
|---|---|---|---|
| 4,457,790 A | 7/1984 | Lindert et al. | 148/6.15 R |
| 5,920,086 A | * 7/1999 | MacFarlane et al. | 257/103 |
| 6,059,896 A | * 5/2000 | Ehara et al. | 148/247 |

FOREIGN PATENT DOCUMENTS

| | | | |
|---|---|---|---|
| EP | 0996179 | 4/2000 | |
| JP | 10312788 | 11/1998 | ............ H01M/2/30 |
| JP | 11-242953 | 9/1999 | |
| JP | 2000-149914 | 5/2000 | |
| JP | 2000-156209 | 6/2000 | |
| JP | 2000215878 | 8/2000 | ............ H01M/2/22 |
| JP | 2000-235845 | 8/2000 | |
| WO | WO 9704145 | 2/1997 | |
| WO | WO 9805804 | 2/1998 | |

* cited by examiner

*Primary Examiner*—Hoa Van Le
(74) *Attorney, Agent, or Firm*—Hayes Soloway P.C.

(57) ABSTRACT

A film-sealed nonaqueous electrolyte battery comprises: a battery element including a non-aqueous electrolyte; a film case having at least a sealant polymer resin film for sealing the battery element; at least a lead terminal extending from the battery element and projecting from the film case, and the lead terminal with a surface having a contact area in contact directly with the sealant polymer resin film, and at least the contact area of the surface of the lead terminal is coated with an anti-corrosion coating film, wherein the anti-corrosion coating film includes: (A) a polymer of structural units of a phenolic compound, and at least a part of the structural units includes a substituent which comprises an amino group or a substituted amino group; (B) a phosphate compound; and (C) a titanium fluorine compound.

25 Claims, 3 Drawing Sheets

FILM-SEALED NON-AQUEOUS ELECTROLYTE BATTERY WITH IMPROVED SURFACE-TREATED LEAD TERMINAL

BACKGROUND OF THE INVENTION

1. Field of the Invention

The present invention relates to a battery, and more particularly to a film-sealed non-aqueous electrolyte battery including a non-aqueous electrolytic solution.

2. Description of the Related Art

Requirements for size reductions of various electronic devices have been on the increase. The importance for size reduction of the battery for realizing the size reductions thereof has also been on the increase. It is effective that a battery element for generating a power is accommodated in a thin film outer case, such as a laminated film case.

The laminated film case comprises laminations of metal foils or sealing polymer resin layers. The laminated film case may seal the battery element by a heat-application. A high reliability of sealing the sealing portions of the laminated film case is necessary for isolating the battery element from the atmosphere and also preventing leakage of the electrolyte of the battery element.

The sealing reliability is particularly important for the battery including a non-aqueous electrolyte. If the sealing is imperfect to allow an entry of moisture from the outside of the battery case, then the electrolyte is deteriorated by the moisture, whereby the battery performance is deteriorated. Some batteries have such a structure that metal plate-shaped lead terminals extend from the battery element through the sealing portion of the laminated film case toward the outside of the case. In this case, an adhered area between the metal plate-shaped lead terminals and a sealant layer of the laminated film case is likely to be deteriorated in sealing reliability to cause a peel between them and form a leak path.

The leak path is likely to be formed through the deteriorated adhered surfaces of the sealant layer and the lead terminals for the following two reasons. First, it is generally difficult to obtain a strong adhesion between the metal surface and the polymer resin surface. Second, lithium salts of inorganic fluoride, for example, $LiPF_6$ have been used frequently for electrolyte salt of the non-aqueous electrolyte, and are likely to be decomposed to generate a fluorine acid which is capable of corrosion of metal, whereby the lead terminal surfaces are corroded, resulting in a deterioration in adhesion between the sealant layer and the lead terminals.

In order to counter-measure the above problems, it was proposed that surface-treated lead terminals are used for the film-sealed non-aqueous electrolyte battery. Japanese laid-open patent publication No. 10-312788 discloses chromate-treatment to surfaces of the lead terminals to form anti-corrosion coating films on the surface of the lead terminals. The anti-corrosion coating films may prevent corrosion by the fluorine acid, for obtaining a desirable high sealing reliability.

The chromate-treatment is superior to other surface treatments in view of its anti-corrosion property. The chromate treatment is carried out by using hexavalent chromium (Cr(VI)) which is harmful substance, for which reason in the environmental viewpoint, it is desirable to use chromium-free surface treatment.

As described above, it is desirable that the anti-corrosion coating film is formed on the lead terminal surface to improve the reliability of adhesion between the sealant layer and the lead terminal, thereby obtaining a desirable high sealing reliability particularly of the film-sealed non-aqueous electrolyte battery. If the lead terminal is electrically connected to the battery element or an external device by a cramping method, a resistance welding method, or an ultrasonic welding method, it is necessary to avoid generation of the contact resistance at the contact point. It is also necessary to prevent that the anti-corrosion coating film is dissolved into the electrolyte, resulting in a deterioration in performance of the battery.

In the above circumstances, the development of a novel film-sealed non-aqueous electrolyte battery with improved surface-treated lead terminals free from the above problems is desirable.

SUMMARY OF THE INVENTION

Accordingly, it is an object of the present invention to provide a novel film-sealed non-aqueous electrolyte battery with improved surface-treated lead terminals free from the above problems.

It is a further object of the present invention to provide a novel film-sealed non-aqueous electrolyte battery with improved surface-treated lead terminals providing a high adhesion reliability between the lead terminals and a sealant layer.

It is a still further object of the present invention to provide a novel film-sealed non-aqueous electrolyte battery with improved surface-treated lead terminals preventing any corrosion of the lead terminal by a fluorine acid.

It is yet a further object of the present invention to provide a novel film-sealed non-aqueous electrolyte battery with improved surface-treated lead terminals preventing any generation of contact resistance between the lead terminals and a sealant layer.

It is a furthermore object of the present invention to provide a novel film-sealed non-aqueous electrolyte battery with improved surface-treated lead terminals having an appropriate breaking strength for allowing a coating film to be broken in electrical connection between the lead terminal and the battery element, thereby avoiding any generation of contact resistance between the lead terminals and a sealant layer.

It is moreover an object of the present invention to provide a novel film-sealed non-aqueous electrolyte battery with improved surface-treated lead terminals preventing that anti-corrosion coating films on the lead terminals are dissolved into an electrolyte.

It is an object of the present invention to provide a novel surface-treated lead terminal for a film-sealed non-aqueous electrolyte battery free from the above problems.

It is a further object of the present invention to provide a novel surface-treated lead terminal for a film-sealed non-aqueous electrolyte battery providing a high adhesion reliability between the lead terminals and a sealant layer.

It is a still further object of the present invention to provide a novel surface-treated lead terminal for a film-sealed non-aqueous electrolyte battery preventing any corrosion of the lead terminal by a fluorine acid.

It is yet a further object of the present invention to provide a novel surface-treated lead terminal for a film-sealed non-aqueous electrolyte battery preventing any generation of contact resistance between the lead terminals and a sealant layer.

It is a furthermore object of the present invention to provide a novel surface-treated lead terminal for a film-sealed non-aqueous electrolyte battery having an appropriate breaking strength for allowing a coating film to be broken in electrical connection between the lead terminal and the battery element, thereby avoiding any generation of contact resistance between the lead terminals and a sealant layer.

It is moreover an object of the present invention to provide a novel surface-treated lead terminal for a film-sealed non-aqueous electrolyte battery preventing that anti-corrosion coating films on the lead terminals are dissolved into an electrolyte.

The present invention provides a film-sealed nonaqueous electrolyte battery comprising: a battery element including a non-aqueous electrolyte; a film case having at least a sealant polymer resin film for sealing the battery element; at least a lead terminal extending from the battery element and projecting from the film case, and the lead terminal with a surface having a contact area in contact directly with the sealant polymer resin film, and at least the contact area of the surface of the lead terminal is coated with an anti-corrosion coating film, wherein the anti-corrosion coating film includes: (A) a polymer of structural units of a phenolic compound, and at least a part of the structural units includes a substituent which comprises an amino group or a substituted amino group; (B) a phosphate compound; and (C) a titanium fluorine compound.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DETAILED DESCRIPTION OF THE PREFERRED EMBODIMENTS

A first aspect of the present invention is a battery comprising: a battery element including a non-aqueous electrolyte; a film case having at least a sealant polymer resin film for sealing the battery element; at least a lead terminal extending from the battery element and projecting from the film case, and the lead terminal with a surface having a contact area in contact directly with the sealant polymer resin film, and at least the contact area of the surface of the lead terminal is coated with an anti-corrosion coating film, wherein the anti-corrosion coating film includes: (A) a polymer of structural units of a phenolic compound, and at least a part of the structural units includes a substituent which comprises an amino group or a substituted amino group; (B) a phosphate compound; and (C) a titanium fluorine compound.

It is preferable that the anti-corrosion coating film has a thickness in the range of 5 nanometers to 1000 nanometers.

It is preferable that an entirety of the surface of the lead terminal is coated with an anti-corrosion coating film.

It is preferable that (A) the polymer of structural units is represented by general formula (I):

where "n" is an average polymerization degree in the range of 2 to 50, "X" is a hydrogen atom, $C_1$–$C_5$ alkyl groups or $C_1$–$C_5$ hydroxy alkyl groups, "Y" is an oxygen atom or a Z-group which is represented by either one of general formulae (II) and (III):

where each of "$R_1$", "$R_2$" and "$R_3$" is independently selected from $C_1$–$C_{10}$ alkyl groups or $C_1$–$C_{10}$ hydroxy alkyl groups, and an averaged number of the Z-groups bonded to each benzene ring is in the range of 0.2 to 1.0.

It is preferable that (A) the polymer of structural units is represented by general formula (IV):

where "$X^1$" in each structural unit is independently selected from a hydrogen atom or $Z^1$-group which is represented by general formula (V):

where each of "$R^1$" and "$R^2$" is independently selected from a hydrogen atom, $C_1$–$C_{10}$ alkyl groups, or $C_1$–$C_{10}$ hydroxy alkyl groups; and "$Y^1$" in general formula (IV) is selected from a hydrogen atom, hydroxyl groups, $C_1$–$C_5$ alkyl groups, $C_1$–$C_5$ hydroxy alkyl groups, $C_6$–$C_{12}$ aryl groups, benzyl groups or a group which is represented by general formula (VI):

(VI)

where each of "$R^3$" and "$R^4$" is independently selected from a hydrogen atom, $C_1$–$C_{10}$ alkyl groups, or $C_1$–$C_{10}$ hydroxy alkyl groups; and if "$Y^1$" is represented by the general formula (VI), then each "$X^2$" is in each structural unit represented by the general formula (VI) is independently selected from a hydrogen atom or $Z^2$-group which is represented by general formula (VII):

(VII)

where each of "$R^5$" and "$R^6$" is independently selected from a hydrogen atom, $C_1$–$C_{10}$ alkyl groups, or $C_1$–$C_{10}$ hydroxy alkyl groups; and "$Y^2$" in the general formula (IV) represents a hydrogen atom or a part of a condensed benzene ring including "$Y^1$", "$Y^2$" and a bonding between "$Y^1$" and "$Y^2$"; and where a total rate of introducing $Z^1$-group and $Z^2$-group into each benzene ring is in the range of 0.2–1.0.

It is preferable that the (B) phosphate compound may optionally be selected from the group consisting of phosphoric acid, phosphate, condensed phosphoric acid, condensed phosphate, zirconium phosphate, and titanium phosphate. Examples of available salts are alkali metal salts such as ammonium salts, sodium salts, and potassium salts.

It is preferable that the (C) titanium fluorine compound may optionally be from the group consisting of titanium hydrofluoric acid, and titanium borofluoric acid.

It is preferable that the lead terminal may comprise aluminum mainly.

It is preferable that the non-aqueous electrolyte may include a lithium salt of an inorganic fluoride The shape of the lead terminal is optional, For example, the lead terminal may have two generally flat surfaces opposite to each other, and an entirety of each of the two generally flat surfaces is coated with the anti-corrosion coating film. In this case, it is preferable that the lead terminal comprises a film-structure which further comprises: a metal foil; and the anti-corrosion coating films coating the metal foil.

It is also preferable that a entirety of surface the lead terminal is coated with the anti-corrosion coating films. In this case, it is preferable that the lead terminal comprises: a core structure comprising a metal foil; and the anti-corrosion coating film coating the core structure.

If the lead terminal has a sectioned area of circle and oval shape, then it is preferable that the entirety of surface of the lead terminal is coated with the anti-corrosion coating film.

The anti-corrosion coating film improves a high adhesion reliability between the lead terminals and the sealant polymer resin film. The anti-corrosion coating film prevents corrosion of the surface of the lead terminal by contacting with a fluorine acid generated in the battery element, whereby preventing any deterioration of the adhesion between the lead terminals and the sealant polymer resin film.

As described above, the anti-corrosion coating film includes: (A) a polymer of structural units of a phenolic compound, and at least a part of the structural units includes a substituent which comprises an amino group or a substituted amino group; (B) a phosphate compound; and (C) a titanium fluorine compound. The anti-corrosion coating film is, free of chromium compounds and chromate which are harmful in the environmental viewpoint.

The anti-corrosion coating, film has an appropriate breaking strength for allowing the film to be broken in electrical connection between the lead terminal and the battery element through available methods such as a cramping method, a resistance welding method, or an ultrasonic welding method, thereby avoiding any generation of contact resistance between the lead terminals and the sealant polymer resin film.

The anti-corrosion coating film prevents that anti-corrosion coating films on the lead terminals are dissolved into an electrolyte.

In accordance with the present invention, the surface of the lead terminal is treated with the phenolic compound polymer. Conventional methods of metal surface treatments with the phenolic compound polymer are disclosed in Japanese laid-open patent publications Nos. 9-31404 and 10-46101. Those conventional methods are not available to form the anti-corrosion coating film on the surface of the lead terminal of the film-scaled non-aqueous electrolyte battery. The present invention was made through further investigation and optimization to compositions of the anti-corrosion coating film.

Preferred Embodiment

Figure 1:
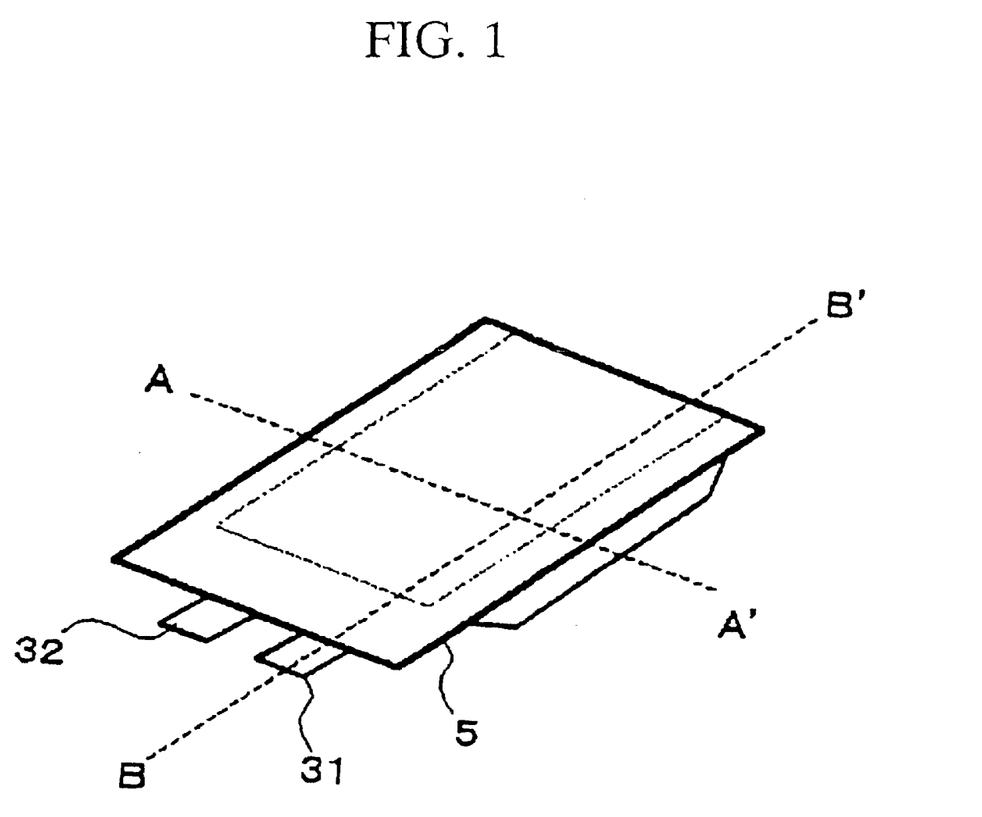
FIG. 1 is a schematic perspective view of a film-sealed non-aqueous electrolyte battery in a preferred embodiment in accordance with the present invention.
Figure 2:
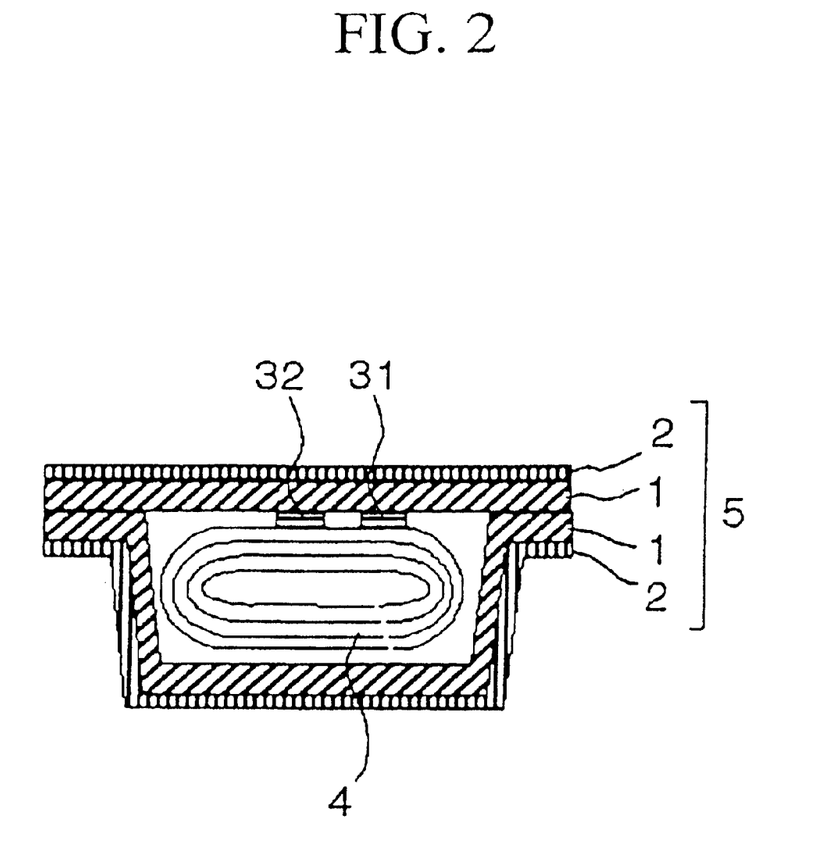
FIG. 2 is a cross sectional elevation view illustrative of the film-sealed non-aqueous electrolyte battery, taken along an A–A' line of FIG. 1.
Figure 3:
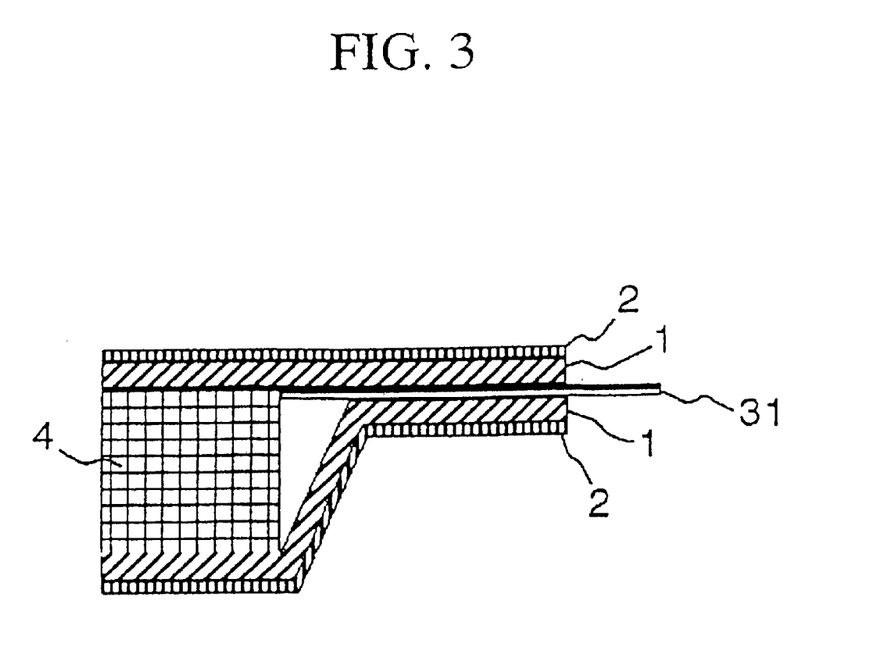
FIG. 3 is an enlarged fragmentary cross sectional elevation view of the film-sealed non-aqueous electrolyte battery, taken along a B–B' line of FIG. 1.

A preferred embodiment according to the present invention will be described in detail with reference to the drawings. FIG. 1 is a schematic perspective view of a film-sealed non-aqueous electrolyte battery in a preferred embodiment in accordance with the present invention. FIG. 2 is a cross sectional elevation view illustrative of the film-sealed non-aqueous electrolyte battery, taken along an A–A' line of FIG. 1. FIG. 3 is an enlarged fragmentary cross sectional elevation view of the film-sealed non-aqueous electrolyte battery, taken along a B–B' line of FIG. 1.

The film-sealed non-aqueous electrolyte battery mainly comprises a battery element 4 and a film case 5 which seals the battery element 4. The battery element 4 includes a non-aqueous electrolyte, a positive electrode, a negative electrode and a separator. The film case 5 further comprises laminations of a sealant polymer resin film 1, a metal foil 2 and a thermally stable resin film. The sealant polymer resin film 1 may be fused or melt by heat application for sealing. The thermally stable resin film is the most outside film. In the drawings, the thermally stable resin film is not shown.

The film-sealed non-aqueous electrolyte battery further includes a positive electrode lead terminal 31 and a negative electrode lead terminal 32. The positive electrode lead terminal 31 is electrically connected to the positive electrode of the battery element 4. The negative electrode lead terminal 32 is electrically connected to the negative electrode of the battery element 4. The battery element 4 and the positive and negative electrode lead terminals 31 and 32 are accommodated in the film case 5, provided that the positive and negative electrode lead terminals 31 and 32 project outside from the film case 5 through a sealing portion, where the positive and negative electrode lead terminals 31 and 32 are in contact directly and tightly with the sealant polymer resin films 1. As described below, at least one of the positive and negative electrode lead terminals 31 and 32 is coated with an anti-corrosion film.

[Lead Terminal Structure]

Each of the positive electrode lead terminal 31 and the negative electrode lead terminal 32 Tray optionally comprise a flat-plated metal with no particular limitation to width, thickness and length thereof. For example, the width of each of the positive electrode lead terminal 31 and the negative electrode lead terminal 32 may be in the range of 1–50 mm. The length of each of the positive electrode lead terminal 31 and the negative electrode lead terminal 32 may be in the range of 5–100 mm. The thickness of each of the positive electrode lead terminal 31 and the negative electrode lead terminal 32 may be in the range of 0.01–0.5 mm.

There is no particular limitation to available materials for the positive electrode lead terminal 31 and the negative electrode lead terminal 32. The know materials are available. For example, aluminum or aluminum alloys are available for the positive electrode lead terminal 31, whilst nickel, copper and alloys thereof are also available for the negative electrode lead terminal 32.

For example, the positive electrode lead terminal 31 may optionally comprise an aluminum flat-plate coated with one or more anti-corrosion films having a thickness in the range of 5 nanometers to 1000 nanometers. Preferably, an entirety of each of both surfaces of the aluminum flat-plate is coated with the anti-corrosion film, provided that the both surfaces are parallel to plane in which the sealant polymer resin films 1 extend.

The anti-corrosion film of the lead terminal is so thin as to have such an appropriate mechanical strength that the anti-corrosion film is allowed to be broken at connection point in electrical connection between the lead terminal and the battery element or between the lead terminal and other device than the battery, resulting in no generation of contact resistance. An ultrasonic welding method and a resistance welding are examples of the available method for electrically connecting the lead terminals to the battery element. In those methods, a welding point of the lead terminal surface receives a friction and causes a micro-fusion or melting, whereby the thin anti-corrosion film is likely to be broken, thereby ensuring an electrical connection through welding between the lead terminal and the electrode of the battery element. The lead terminal may also be connected electrically by any available cramping methods, for example, using a crocodile clip. In this case, the thin anti-corrosion film is likely to be broken, thereby ensuring an electrical connection through cramping between the lead terminal and the electrode of the battery element. In this viewpoint of allowing easy breaking the anti-corrosion film in cramping process or welding process for electrical connection between the lead terminal and the battery element, a preferable thickness of the anti-corrosion film is ranged from 5 nanometers to 500 nanometers.

In view of allowing the anti-corrosion film to exhibit a sufficient anti-corrosion performance, the thickness of the anti-corrosion film is preferably ranged from 50 nanometers to 1000 nanometers, and more preferably ranged from 100 nanometers to 500 nanometers.

In view of allowing the anti-corrosion film to exhibit a sufficient anti-corrosion performance and also allowing easy breaking the anti-corrosion film in cramping process or welding process for electrical connection between the lead terminal and the battery element, the thickness of the anti-corrosion film is preferably ranged from 5 nanometers to 1000 nanometers, and more preferably ranged from 50 nanometers to 500 nanometers, and further more preferably ranged from 100 nanometers to 500 nanometers.

Coating the anti-corrosion film on the entirety of each of the opposite surfaces of the flat-plated lead terminal provides advantages that opposite surfaces of an original metal plate may be coated with the anti-corrosion films before the surface-coated metal plate may be shaped in a plurality of the load terminals.

The width of the lead terminal may, for example, be ranged from 1 mm to 50 mm. The length of the lead terminal may, for examples be ranged from 5 mm to 100 mm. A metal foil may be used as a raw material for the lead terminals, wherein the metal foil has much wider width and much longer length than the above width and length of the lead terminals. The metal foil may be slit and rolled in coil-like for allowing the slit metal foil is cut at an appropriate length to shape the lead terminal. It is more effective to undo the coil of the slit metal foil for continuous surface treatment of the metal foil, and concurrently the surface-treated slit metal foil is again rolled in coil-like before the surface-treated slit metal foil is released from the coil for cutting the same to shape the surface-treated lead terminal.

The area of the coating film and the efficiency of coating process may depend on the timing or the step involved in the sequential processes for forming the lead terminals. The cost of each lead terminal also depends on the area of the coating film and the efficiency of the coating process. If the metal foil is slit and then surface-treated with the anti-corrosion film, then not only opposite surfaces of the slit metal foil but also slit-cut sides of the slit metal foil are surface-treated with the anti-corrosion film.

It has been generally known that leak paths are likely to be formed at sides of the lead terminal which is sealed by the film case. The anti-corrosion film may contribute to prevent formation of the leak paths because the sealant polymer resin film 1 is melted in the heat-sealing process, and the anti-corrosion film improves the wettability of the melt sealant polymer resin over the anti-corrosion film of the lead terminal.

If the original metal foil is coated with the anti-corrosion film and then the surface-coated metal foil is cut at a predetermined width, then the sectioned surfaces of the cut surface-coated metal foil are not coated with the anti-corrosion film. However, the process efficiency is higher than the above processes, wherein the original metal foil is cut at the predetermined width to form plural metal foils which are then surface-coated with the anti-corrosion film.

In the above described example, the lead terminal has a rectangle sectioned shape. It is also possible that the sectioned shape of the lead terminal is optional. For example, a circle or oval shape is of course available as the sectioned shape of the lead terminal.

Japanese laid-open patent publication No. 10-312788 discloses that the surface treatment is selectively carried out only to the sealing portion of the led terminal in consideration of a possible dissolution of the coating film into the electrolyte and also of a possible defect of welding the lead terminal to the electrode of the battery element, whereby the welding defect causes the contact resistance. For carrying out the selective surface treatment, it was proposed that the coating film is selectively polished or dissolved, or proposed that the surface treatment is carried out by using a mask of a tape, for example, a mending tape. Those additional processes makes it difficult to achieve the efficient productivity.

In accordance with the present invention, the anti-corrosion film prevents the generation of the contact resistance in electrical connection of the lead terminal to the electrode of the battery element. The anti-corrosion film is not dissolved into the electrolyte of the battery element, for which reason the entire surface of the lead terminal may be coated with the anti-corrosion film. It is not essential that the anti-corrosion film selectively coats the scaling portion of the lead terminal. This allows that the original metal plate such as the original metal foil is surface-coated with the anti-corrosion film before the surface-coated metal plate is cut to be shaped in the lead terminals at the highly efficient processes. No additional processes such as selectively removing the anti-corrosion film are necessary.

Japanese laid-open patent publications Nos. 9-31404 and 10-46101 disclose that titanium fluorine compound is mixed into a treating liquid containing phenol polymer and phosphate compound to prepare a treatment liquid which is then used for carrying out a surface treatment of the lead terminal. In order to improve the adhesion reliability between the lead terminal and the sealant polymer resin film, it is preferable that the anti-corrosion film contains a phosphate compound. It is more preferable that anti-corrosion film contains both a phosphate compound and a titanium fluorine compound for the following reasons.

Titanium fluorine compound is dissociated in the treatment liquid, whereby hydrofluoric acid is present in the treatment liquid. This hydrofluoric acid contributes to remove a natural oxide film on the metal surface and also to allow formation of the resin film as the anti-corrosion film, whereby the anti-corrosion film is stable. The use of the hydrofluoric acid containing treatment liquid is particularly effective to the lead terminal made of aluminum. In consideration of the oxide film over the metal surface of the lead terminal, hydrofluoric acid is intentionally added into the treatment liquid. In the various fluorine compounds, titanium fluorine compound is particularly preferable because a bridge is formed between phenol polymer and titanium, resulting in the strong anti-corrosion film.

Titanium hydrofluoric acid and titanium borofluoric acid are examples of the preferable titanium fluorine compounds. For mixing titanium and hydrofluoric acid, it may be possible that titanil sulfate or titanium chloride is used together with hydrofluoric acid. However, this method provides the following disadvantages. Soluble sulfuric ions or chlorine ions reside in the anti-corrosion film, and residual sulfuric ions or chlorine ions deteriorate the anti-corrosion property of the anti-corrosion film. The residual sulfuric ions or chlorine ions further reduces a rate of formation of bridge between titanium and phenol polymer, resulting in formation of the undesirable fragile coating film.

[Battery Element]

There are no particular limitations to the battery element 4 including the positive and negative electrodes and the separator as essential elements. For example, the battery element 4 may comprise laminations of plural flat plates, a rolled structure of plates, and a flat-rolled structure of plates. In view of ensuring the large capacity, the flat-rolled structure of plates might be preferable.

[Positive Electrode]

There are no particular imitation to the positive electrode, provided that the positive electrode is capable of absorbing positive ions and emitting negative ions. Known materials for the positive electrode of the secondary battery are also available, for example, metal oxides such as $LiMnO_2$, $LiMn_2O_4$, $LiCoO_2$, and $LiNiO_2$, electrically conductive polymers such as polyacetylene and polyaniline, and disulfide compounds represented by a general formula (R—Sm)n, where R is aliphatic compound or aromatic compound, and S is sulfur, "m" is integer of not less than 1, and "n" is integer of not less than 1. Examples of the disulfide compounds are dithioglycol, 2,5-dimercapt-1,3,4-thiadiazole, and S-triazine-2,4,6-trithiol.

It is also possible that a positive electrode active material is mixed with a binder or a functional material to form the positive electrode. Examples of the available binder are halogen-containing polymers such as polyvinylidene fluoride. Examples of the functional materials are electrically conductive polymers such as acetylene black, polypyrrole, and polyaniline, polymer electrolytes ensuring ion-conductivity and complexes thereof.

[Negative Electrode]

There are also no particular limitations to the negative electrode, provided that the negative electrode is capable of absorbing and emitting cations. Examples of the available materials for the negative electrode are crystal carbons such as graphitizated carbons obtained by a high temperature heat treatment to natural black carbon, coal pitch and oil pitch, and amorphous carbons obtained by a heat treatment of coal, oil-pitch cokes, and acetylene-pitch cokes, as well as known negative electrode active materials for the secondary battery such as metal lithium and lithium alloys such as AlLi.

[Non-aqueous Electrolyte]

Examples of available non-aqueous electrolytes are obtained by dissolving a salt comprising an alkali metal as cation and a halogen-containing compound as anion into a highly polarized basic solvent which is available for the electrolyte of the secondary battery. Examples of the available basic solvent are ethylene carbonate, propylene carbonate, dimethyl carbonate, diethyl carbonate, methyl-ethyl carbonate, gamma-butyrolaetone, N,N'-dimethylformamide, dimethylsulfoxide, N-methylpyrolidone, and m-cresol. Examples of the alkali metal as cation are Li, K, and Na. Examples of the halogen-containing compound as anion are $ClO_4-$, $Br_4-$, $PF_6-$, $CF_3SO_3-$, $(CF_3SO_2)_2N-$, $(C_2F_5SO_2)_2N-$, $(CF_3SO_2)_3C-$, and $(C_2F_5SO_2)_3C-$. In view of the ion-conductivity, the salt comprising the inorganic fluoride such as $PF_6$ and lithium is preferable. The salt comprising the inorganic fluoride such as $LiPF_6$ and lithium is likely to generate fluorine acid. However, the anti-corrosion film of the present invention is effective to prevent the above disadvantages due to the generated fluorine acid. Particularly, $LiPF_6$ is preferable in view of the ion-conductivity. It is possible to use the basic solvents or the electrolytic salts solely or in combination of plural kinds thereof. The electrolyte may be in a solution or a gel.

[Film Case]

The film case 5 may preferably comprise laminations of the metal thin film 2 and the sealant polymer resin film 1. The metal thin film 2 acts as gas barrier film. The sealant polymer resin film 1 acts as sealing the film case 5. There are no particular limitation to the respective thicknesses of the metal thin film 2 and the sealant polymer resin film 1. The sealant polymer resin film 1 is the most inner film. A thermally stable protective layer is the most outer film, provided that the thermally stable protective layer is not illustrated in the drawings. Polyester, polyamide and liquid crystal polymer are available as the protective layer. Thermoplastic reins are also available as the base materials for the sealant polymer resin film 1, for example, polyethylene, polypropylene, ionomer, acidic-denatured polyethylene such as acidic-denatured polyethylene mateate, acidic-denatured polypropylene such as acidic-denatured polypropylene mateate, polyethylene terephthalate (PET), polyethylene naplithalate (PEN), polyethylene isophthalate (PEI), a blend of PET and PEN, a blend of PET and PEI, polyamide resins, a blend of a polyamide resin and PET, and a blend of xylene base containing polyamide and PET. Those resins may be used solely or in combination to form a multi-layered structure of the sealant polymer resin film 1. Those multilayers may optionally be adhered by an adhesive agent. Al, Sn, Cu, Ni, and stainless steel are available as the metal layer 2 for acting as the gas barrier. A thickness of the metal layer 2 may be ranged from 5 micrometers to 500 micrometers.

The structure of the film case may be optional, provided that the film case has the scalant polymer resin film 1. It is possible to modify the structure of the film case like that the film case comprises a single-layered structure of the thermoplastic resin film or comprises a double layered structure of the thermally stable resin plastic resin acting as the gas barrier and the thermo-plastic resin film.

[Heat Sealing Method]

The heat sealing process for sealing the film-sealed non-aqueous electrolyte battery may be carried out as follows. A heater may be used which comprises a metal resistance in the form of ribbon or block. The heater may be pressed to the sealing portion of the film case 5 before a current may be applied to the heater at a predetermined time for generating a predetermined heat. A metal block maintained at a predetermined temperature may be pressed to the sealing portion of the film case 5. The lead terminal may be selectively heated by a high frequency induction heating method whilst the sealing portion of the film case 5 may be pressed. The lead terminal may be selectively heated by applying eddy current to the lead terminal to generate Joule's heat whilst the sealing portion of the film case 5 may be pressed.

[Thin Secondary Battery]

There are no particular limitations to the manufacturing processes for the film-sealed non-aqueous electrolyte battery. The positive electrode lead terminal 31 and the negative electrode lead terminal 32 may be electrically connected to the battery element 4 by the ultrasonic welding method. The battery element 4 is enclosed by the film case 5, wherein the positive electrode lead terminal 31 and the negative electrode lead terminal 32 project from a first side of the film case 5. The first side of the film case 5 is heat-sealed, and one of the remaining two sides of the film case 5 is also heat-sealed. The electrolyte solution is injected through the remaining unsealed side of the film case 5, before the remaining unsealed side of the film case 5 is finally heat-sealed under a reduced pressure condition.

The present invention is applicable to any film-sealed electric or electronic devices with at least a lead terminal such as film-sealed electric double layer capacitors, film-sealed electrolyte capacitors and film-sealed sensors.

EXAMPLE 1

Lithium manganate powders of spinel structure, carbon donor providing conductivity, and polyvinylidene fluoride were blended at weight ratios of 90:5:5 into N-methylpyrolidone (hereinafter refereed to as NMP) and stirred to form a slurry containing NMP. An amount of NMP was adjusted in consideration of viscosity of the slurry. The slurry was uniformly applied by a doctor blade onto a first surface of an aluminum foil of 20 micrometers in thickness which is a positive collector for subsequent dry process in vacuum pressure at 100° C. for 2 hours. The slurry was also uniformly applied onto a second surface of the aluminum foil for subsequent dry process in vacuum pressure. This sheet was then rolled and pressed to form a positive electrode active material layer. A theoretical capacity was 600 mAh.

Amorphous carbon powders, and polyvinylidene fluoride were blended at weight ratios of 91:9 into N-methylpyrolidone (hereinafter referred to as NMP) and stirred to form a slurry containing NMP. An amount of NMP was adjusted in consideration of viscosity of the slurry. The slurry was uniformly applied by a doctor blade onto a first surface of a copper foil of 10 micrometers in thickness which is a negative collector for subsequent dry process in vacuum pressure at 100° C. for 2 hours. A ratio in theoretical capacity for a unit area of the negative electrode layer to the positive electrode layer was adjusted to be 1:1. The slurry was also uniformly applied onto a second surface of the copper foil for subsequent dry process in vacuum pressure. This sheet was then rolled and pressed to form a negative electrode active material layer.

Laminations of the positive electrode collector layer, a micro-pours separator and the negative electrode collector layer were prepared. The micro-pours separator has a triple-layered structure comprising a polypropylene layer, a polyethylene layer, and a polypropylene layer. The laminations were rolled around a core with a oval sectioned shape and then subjected to a heat press to form a thin oval-shaped electrode-rolled structure. A flat-plate aluminum lead terminal as a positive electrode lead terminal and a flat plate nickel lead terminal as a negative electrode lead terminal were connected by a ultrasonic welding method to the positive electrode collector and the negative electrode collector respectively. Each of the flat-plate aluminum lead terminal and the flat plate nickel lead terminal has the same sizes of 4 mm in width, 0.1 mm in thickness and 100 mm in length. The positive electrode lead terminal was surface-treated as follows.

A rolled structure of an aluminum flat plate with sizes of 4 mm in width, 0.1 mm in thickness and 100 mm in length was prepared. The aluminum flat plate was pulled out from the rolled structure for subsequent surface-treatment thereto before the surface-treated aluminum flat plate was again rolled. The surface-treatment was carried out by applying a surface treatment liquid onto first and second main surfaces and side faces of the aluminum flat plate, whereby a coating film of 200 nanometers in thickness were formed on the first and second main surfaces and the side faces of the aluminum flat plate, and further dry processed at 120° C. for 20 seconds. The used surface treatment liquid includes (A) a polymer of structural units of a phenolic compound, where at least a part of the structural units includes a substituent which comprises an amino group or a substituted amino group; (B) a phosphate compound; and (C) a titanium fluorine compound. The surface-treated aluminum flat plate was then cut out at 100 mm to form a plurality of the positive electrode lead terminals. The surface treatment liquid is commercially available from Nihon Parkerizing Co., Ltd.

A laminate film was prepared, which comprises an acidic-denatured polypropylene layer, an adhesive agent layer, and a nylon layer, wherein the laminate film has a total thickness of 0.13 mm and the acidic-denatured polypropylene layer has a thickness of 0.05 mm. The laminate film was then cut out at a predetermined size. A concave portion was selectively formed in the cut laminate film wherein the concave portion has a size adjusted to the electrode-rolled structure. The laminate film was folded to enclose the electrode-rolled structure, and three sides of the laminate film were then heat-sealed, thereby preparing a film-sealed battery as shown in FIGS. 1, 2 and 3.

The above heat-sealing process was carried out at 190° C. for 10 seconds, wherein the positive electrode lead terminal and the negative electrode lead terminal project from the above first side of the laminate film. The above first side, from which the positive electrode lead terminal and the negative electrode lead terminal project, was opposite to the folding side. The above first and second sides of the laminate film were heat-sealed and then the electrolyte was impregnated into the electrode-rolled structure before the third side of the laminate film was heat-sealed. The electrolyte-impregnated electrode-rolled structure substantially corresponds to the battery element 4 shown in FIGS. 2 and 3. The electrolyte was used which comprised a 1 moL/liter of $LiPF_6$ as a supporting salt and a mixing solvent of diethyl carbonate and ethylene carbonate of 50:50 in weight ratio.

A width of the sealing portion on the first side, from which the positive electrode lead terminal and the negative electrode lead terminal project, was 4.5 mm. A width of the sealing portions on the second and third sides was 4.0 mm. A thickness of the battery was 3.6 mm. The film-sealed battery of Example 1 was completed.

EXAMPLE 2

Lithium manganate powders of spinel structure, carbon donor providing conductivity, and polyvinylidene fluoride were blended at weight ratios of 90:5:5 into N-methylpyrolidone (hereinafter referred to as NMP) and stirred to form a slurry containing NMP. An amount of NMP was adjusted in consideration of viscosity of the slurry. The slurry was uniformly applied by a doctor blade onto a first surface of an aluminum foil of 20 micrometers in thickness which is a positive collector for subsequent dry process in vacuum pressure at 100° C. for 2 hours. The slurry was also uniformly applied onto a second surface of the aluminum foil for subsequent dry process in vacuum pressure. This sheet was then rolled and pressed to form a positive electrode active material layer. A theoretical capacity was 600 mAh.

Amorphous carbon powders, and polyvinylidene fluoride were blended at weight ratios of 91:9 into N-methylpyrolidone (hereinafter referred to as NMP) and stirred to form a slurry containing NMP. An amount of NMP was adjusted in consideration of viscosity of the slurry. The slurry was uniformly applied by a doctor blade onto a first surface of a copper foil of 10 micrometers in thickness which is a negative collector for subsequent dry process in vacuum pressure at 100° C. for 2 hours. A ratio in theoretical capacity for a unit area of the negative electrode layer to the positive electrode layer was adjusted to be 1:1. The slurry was also uniformly applied onto a second surface of the copper foil for subsequent dry process in vacuum pressure. This sheet was then rolled and pressed to form a negative electrode active material layer.

Laminations of the positive electrode collector layer, a micro-pours separator and the negative electrode collector layer were prepared. The micro-pours separator has a triple-layered structure comprising a polypropylene layer, a polyethylene layer, and a polypropylene layer. The laminations were rolled around a core with a oval sectioned shape and then subjected to a heat press to form a thin oval-shaped electrode-rolled structure. A flat-plate aluminum lead terminal as a positive electrode lead terminal and a flat plate nickel lead terminal as a negative electrode lead terminal were connected by a ultrasonic welding method to the positive electrode collector and the negative electrode collector respectively. Each of the flat-plate aluminum lead terminal and the flat plate nickel lead terminal has the same sizes of 4 mm in width, 0.1 mm in thickness and 100 mm in length. The positive electrode lead terminal was surface-treated as follows.

A rolled structure of an aluminum flat plate with sizes of 40 mm in width, 0.1 mm in thickness and 100 mm in length was prepared. The aluminum flat plate was pulled out from the rolled structure for subsequent surface-treatment thereto before the surface-treated aluminum flat plate was again rolled. The rolled-structure of the surface-treated plate with the wide width of 40 mm was then slit at a width of 4 mm.

The surface-treatment was carried out by applying a surface treatment liquid onto first and second main surfaces and side faces of the aluminum flat plate, whereby a coating film of 50 nanometers in thickness were formed on the first and second main surfaces and the side faces of the aluminum flat plate, and further dry processed at 120° C. for 20 seconds. The used surface treatment liquid includes (A) a polymer of structural units of a phenolic compound, where at least a part of the structural units includes a substituent which comprises an amino group or a substituted amino group; (B) a phosphate compound; and (C) a titanium fluorine compound. The surface-treated aluminum flat plate was then cut out at 100 mm to form a plurality of the positive electrode lead terminals. The surface treatment liquid is commercially available from Nihon Parkerizing Co., Ltd.

A laminate film was prepared, which comprises an acidic-denatured polypropylene layer, an adhesive agent layer, and a nylon layer, wherein the laminate film has a total thickness of 0.13 mm and the acidic-denatured polypropylene layer has a thickness of 0.05 mm. The laminate film was then cut out at a predetermined size. A concave portion was selectively formed in the cut laminate film, wherein the concave portion has a size adjusted to the electrode-rolled structure. The laminate film was folded to enclose the electrode-rolled structure, and three sides of the laminate film were then heat-sealed, thereby preparing a film-sealed battery as shown in FIGS. 1, 2 and 3.

The above heat-sealing process was carried out at 190° C. for 10 seconds, wherein the positive electrode lead terminal and the negative electrode lead terminal project from the above first side of the laminate film. The above first side, from which the positive electrode lead terminal and the negative electrode lead terminal project, was opposite to the folding side. The above first and second sides of the laminate film were heat-sealed and then the electrolyte was impregnated into the electrode-rolled structure before the third side of the laminate film was heat-sealed. The electrolyte-impregnated electrode-rolled structure substantially corresponds to the battery element 4 shown in FIGS. 2 and 3. The electrolyte was used which comprised a 1 mol/liter of $LiPF_6$ as a supporting salt and a mixing solvent of diethyl carbonate and ethylene carbonate of 50:50 in weight ratio.

A width of the sealing portion on the first side, from which the positive electrode lead terminal and the negative electrode lead terminal project, was 4.5 mm. A width of the sealing portions on the second and third sides was 4.0 mm. A thickness of the battery was 3.6 mm. The film-sealed battery of Example 2 was completed.

Comparative Example 1

The film-sealed battery was prepared in the same manner as in Example 1, except that the surface-untreated aluminum plate was used for the positive electrode lead terminal.

Comparative Example 2

The film-sealed battery was prepared in the same manner as in Example 1, except that the surface treatment to the aluminum plate was carried out by using a zirconium phosphate based surface treating liquid which is commercially available from Nihon Parkerizing Co., Ltd.

[Evaluation Method]

Two of the batteries of Example 1, two of the batteries of Example 2, two of the batteries of Comparative Example 1 and two of the batteries of Comparative Example 2 were prepared for the following evaluations. First one of the two batteries of each of Examples 1 and 2 and Comparative Examples 1 and 2 was subjected to the following peeling test immediately after the battery was prepared. The second one was subjected to the peeling test after the following 500-cycle charge/discharge test was carried out.

The peeling test was carried out as follows. Immediately after the battery was prepared the aluminum lead terminal as the positive electrode lead terminal and the sealing portion on the first side of the laminate film was cut out, and the laminate film was further cut at the same width as the aluminum lead terminal. By use of a stress measuring device, the laminate film was peeled from the aluminum lead terminal as the positive electrode lead terminal, wherein a pair of tensile chucks fixing the lead terminal and the laminate film was distanced at a constant speed with continuous recording the increasing stress. A length in a tensile direction of the adhered region with an adhesion strength of not less than 1 N/mm was measured, wherein this length is refereed to as "adhesion region length".

The cycle test was carried out by 500-cycles charge-discharge processes at 45° C. The charge up to 4.2V was carried out at 600 mA, including a constant voltage charge process at 4.2V. The discharge up to 3.0V was carried out at 600 mA. The 500-cycles charge-discharge processes took about ten weeks. After the 500-cycles charge/discharge test was carried out, then the peeling test was carried out to the second one of the battery.

[Evaluation on Adhesion Reliability]

The following Table 1 shows relative values of the adhesion region lengths of the respective first and second batteries of each of Examples 1 and 2 and Comparative Examples 1 and 2, wherein the measured adhesion region length of the first battery of Example 1 was represented to be 1 as a reference, and other measured adhesion region lengths of the second battery of Example 1 and the first and second batteries of Example 2 and Comparative Examples 1 and 2 are represented to be relative values with reference to that of the first battery of Example 1.

TABLE 1

|  | Direct peeling test First battery | Peeling test after 500-cycle test Second battery |
|---|---|---|
| Example 1 | 1.0 | 1.0 |
| Example 2 | 1.0 | 1.0 |
| Comp. Ex. 1 | 1.0 | 0.2 |
| Comp. Ex. 2 | 1.0 | 0.8 |

In the direct pealing test immediately after the batteries were prepared, it was confirmed that the adhesion region length between the laminate film and the positive electrode lead terminal is uniform in Examples 1 and 2 and Comparative Examples 1 and 2.

In the pealing test after the 500-cycle test was carried out, it was confirmed that the adhesion region length between the laminate film and the positive electrode lead terminal is uniform in Examples 1 and 2 but is 20% in Comparative Example 1 and 80% in Comparative Example 2.

[Evaluation on Cyclic Characteristic]

The batteries in Examples 1 and 2 exhibited almost uniform performances from first to five hundredth cycles.

This result shows that no contact resistance was generated at a connection point between the lead terminal and the battery element as well as another connection point between the lead terminal and the used charge/discharge apparatus. This result also shows that the anti-corrosion film on the lead terminal was not dissolved into the electrolyte.

Although the invention has been described above in connection with several preferred embodiments therefor, it will be appreciated that those embodiments have been provided solely for illustrating the invention, and not in a limiting sense. Numerous modifications and substitutions of equivalent materials and techniques will be readily apparent to those skilled in the art after reading the present application, and all such modifications and substitutions are expressly understood to fall within the true scope and spirit of the appended claims.

What is claimed is:

1. A lead terminal connected with an electric device sealed with a film case having at least a sealant polymer resin film for sealing said electric device, and a surface of said lead terminal having a contact area in contact directly with said sealant polymer resin film, and said contact area of said surface of said lead terminal being coated with an anti-corrosion coating film, wherein said anti-corrosion coating film includes:

(A) a polymer of structural units of a phenolic compound, and at least a part of said structural units includes a substituent which comprises an amino group or a substituted amino group;

(B) a phosphate compound; and

(C) a titanium fluorine compound, and wherein said anti-corrosion coating film has a thickness in the range of 5 nanometers to 1000 nanometers.

2. The lead terminal as claimed in claim 1, wherein an entirety of said surface of said lead terminal is coated with an anti-corrosion coating film.

3. The lead terminal as claimed in claim 1, wherein (A) said polymer of structural units is represented by general formula (I):

where "n" is an average polymerization degree in the range of 2 to 50, "X" is a hydrogen atom, a $C_1$–$C_5$ alkyl group or a $C_1$–$C_5$ hydroxy alkyl group, "Y" is an oxygen atom or a Z-group which is represented by either one of general formulae (II) and (III):

(II)

(III)

where each of "$R_1$", "$R_2$" and "$R_3$" is independently selected from a $C_1$–$C_{10}$ alkyl group or a $C_1$–$C_{10}$ hydroxy alkyl group, and an averaged number of said Z-groups bonded to each benzene ring is in the range of 0.2 to 1.0.

4. The lead terminal as claimed in claim 1, wherein (A) said polymer of structural units is represented by general formula (IV):

(IV)

where "$X^1$" in each structural unit is independently selected from a hydrogen atom or a $Z^1$-group which is represented by general formula (V):

(V)

where each of "$R^1$" and "$R^2$" is independently selected from a hydrogen atom, a $C_1$–$C_{10}$ alkyl group, or a $C_1$–$C_{10}$ hydroxy alkyl group; and "$Y^{l}$" in general formula (IV) is selected from a hydrogen atom, a hydroxyl group, a $C_1$–$C_5$ alkyl group, a $C_1$–$C_5$ hydroxy alkyl group, a $C_6$–$C_{12}$ aryl group, a benzyl group or a group which is represented by general formula (VI):

(VI)

where each of "$R^3$" and "$R^4$" is independently selected from a hydrogen atom, a $C_1$–$C_{10}$ alkyl group, or a $C_1$–$C_{10}$ hydroxy alkyl group; and if "$Y^1$" is represented by the general formula (VI), then each "$X^2$" is in each structural unit represented by the general formula (VI) is independently selected from a hydrogen atom or a $Z^2$-group which is represented by general formula (VII):

(VII)

where each of "$R^5$" and "$R^6$" is independently selected from a hydrogen atom, a $C_1$–$C_{10}$ alkyl group, or a $C_1$–$C_{10}$ hydroxy alkyl group; and "$Y^2$" in the general formula (IV) represents a hydrogen atom or a part of a condensed benzene ring including "$Y^1$", "$Y^2$" and a bonding between "$Y^1$" and "$Y^2$"; and where a total rate of introducing $Z^1$-group and $Z^2$-group into each benzene ring is in the range of 0.2–1.0.

5. The lead terminal as claimed in claim 1, wherein said (B) phosphate compound is selected from the group consisting of phosphoric acid, phosphate, condensed phosphoric acid, condensed phosphate, zirconium phosphate, and titanium phosphate.

6. The lead terminal as claimed in claim 1, wherein said (C) titanium fluorine compound is selected from the group consisting of titanium hydrofluoric acid, and titanium borofluoric acid.

7. The lead terminal as claimed in claim 1, wherein said lead terminal includes aluminum.

8. The lead terminal as claimed in claim 1, wherein said lead terminal has two generally flat surfaces opposite to each other, and an entirety of each of said two generally flat surfaces is coated with said anti-corrosion coating film.

9. The lead terminal as claimed in claim 8, wherein said lead terminal comprises a film-structure which further comprises: a metal foil; and said anti-corrosion coating films coating said metal foil.

10. The lead terminal as claimed in claim 1, wherein a entirety of surface said lead terminal is coated with said anti-corrosion coating films.

11. The lead terminal as claimed in claim 10, wherein said lead terminal comprises: a core structure comprising a metal foil; and said anti-corrosion coating film coating said core structure.

12. The battery as claimed in claim 1, wherein said thickness of said anti-corrosion coating film is in the range of 50 nanometers to 500 nanometers.

13. A battery comprising:
a battery element including a non-aqueous electrolyte;
a film case having at least a sealant polymer resin film for sealing said battery element;
at least a lead terminal extending from said battery element and projecting from said film case and said lead terminal with a surface having a contact area in contact directly with said sealant polymer resin film, and at least said contact area of said surface of said lead terminal is coated with an anti-corrosion coating film,
wherein said anti-corrosion coating film includes:
(A) a polymer of structural units of a phenolic compound and at least a part of said structural units includes a substituent which comprises an amino group or a substituted amino group;
(B) a phosphate compound; and
(C) a titanium fluorine compound, and wherein said anti-corrosion coating film has a thickness in the range of 5 nanometers to 1000 nanometers.

14. The battery as claimed in claim 13, wherein an entirety of said surface of said lead terminal is coated with an anti-corrosion coating film.

15. The battery as claimed in claim 13, wherein (A) said polymer of structural units is represented by general formula (I):

where "n" is an average polymerization degree in the range of 2 to 50, "X" is a hydrogen atom, a $C_1$–$C_5$ alkyl group or a $C_1$–$C_5$ hydroxy alkyl group, "Y" is a oxygen atom or a Z-group which is represented by either one of general formulae (II) and (III):

where each of "$R_1$", "$R_2$" and "$R_3$" is independently selected from a $C_1$–$C_{10}$ alkyl group or a $C_1$–$C_{10}$ hydroxy alkyl group, and an averaged number of said Z-groups bonded to each benzene ring is in the range of 0.2 to 1.0.

16. The battery as claimed in claim 13, wherein (A) said polymer of structural units is represented by general formula (IV):

where "$X^1$" in each structural unit is independently selected from a hydrogen atom or a $Z^1$-group which is represented by general formula (V):

where each of "$R^1$" and "$R^2$" is independently selected from a hydrogen atom, a $C_1$–$C_{10}$ alkyl group, or a $C_1$–$C_{10}$ hydroxy alkyl group; and "$Y^1$" in general formula (IV) is selected from a hydrogen atom, a hydroxyl group, a $C_1$–$C_5$ alkyl group, a $C_1$–$C_5$ hydroxy alkyl group, a $C_6$–$C_{12}$ aryl group, a benzyl group or a group which is represented by general formula (VI):

where each of "$R^3$" and "$R^4$" is independently selected from a hydrogen atom, a $C_1$–$C_{10}$ alkyl group, or a $C_1$–$C_{10}$ hydroxy alkyl group; and if "$Y^1$" is represented by the general formula (VI), then each "$X^2$" is in each structural unit represented by the general formula (VI) is independently selected from a hydrogen atom or a $Z^2$-group which is represented by general formula (VII):

where each of "$R^5$" and "$R^6$" is independently selected from a hydrogen atom, a $C_1$–$C_{10}$ alkyl group, or a $C_1$–$C_{10}$ hydroxy alkyl group; and "$Y^2$" in the general formula (IV) represents a hydrogen atom or a part of a condensed benzene ring including "$Y^1$", "$Y^2$" and a bonding between "$Y^1$" and "$Y^2$"; and where a total rate of introducing $Z^1$-group and $Z^2$-group into each benzene ring is in the range of 0.2–1.0.

17. The battery as claimed in claim 13, wherein said (B) phosphate compound is selected from the group consisting of phosphoric acid, phosphate, condensed phosphoric acid, condensed phosphate, zirconium phosphate, and titanium phosphate.

18. The battery as claimed in claim 13, wherein said (C) titanium fluorine compound is selected from the group consisting of titanium hydrofluoric acid, and titanium borofluoric acid.

19. The battery as claimed in claim 13, wherein said lead terminal includes aluminum.

20. The battery as claimed in claim 13, wherein said non-aqueous electrolyte includes a lithium salt of an inorganic fluoride.

21. The battery as claimed in claim 13, wherein said lead terminal has two generally flat surfaces opposite to each other, and an entirety of each of said two generally flat surfaces is coated with said anti-corrosion coating film.

22. The battery as claimed in claim 21, wherein said lead terminal comprises a film-structure which further comprises: a metal foil; and said anti-corrosion coating films coating said metal foil.

23. The battery as claimed in claim 13, wherein a entirety of surface said lead terminal is coated with said anti-corrosion coating films.

24. The battery as claimed in claim 23, wherein said lead terminal comprises: a core structure comprising a metal foil; and said anti-corrosion coating film coating said core structure.

25. The battery as claimed in claim 13, wherein said thickness of said anti-corrosion coating film is in the range of 50 nanometers to 500 nanometers.

* * * * *

UNITED STATES PATENT AND TRADEMARK OFFICE
CERTIFICATE OF CORRECTION

PATENT NO. : 6,902,844 B2
DATED : June 7, 2005
INVENTOR(S) : Yageta et al.

It is certified that error appears in the above-identified patent and that said Letters Patent is hereby corrected as shown below:

<u>Column 17,</u>
Line 45, "$Y^l$" should be -- $Y^1$ --.

Signed and Sealed this

Twenty-eighth Day of March, 2006

JON W. DUDAS
*Director of the United States Patent and Trademark Office*